United States Patent [19]
Nakaso et al.

[11] 4,281,385
[45] Jul. 28, 1981

[54] CONTROL SYSTEM FOR A MACHINE TOOL

[75] Inventors: Toru Nakaso, Nagoya; Kenji Nomura, Aichi; Kunimichi Nakashima, Anjo, all of Japan

[73] Assignee: Toyodá-Koki Kabushiki Kaisha, Kariya, Japan

[21] Appl. No.: 51,187

[22] Filed: Jun. 22, 1979

[30] Foreign Application Priority Data

Jul. 6, 1978 [JP] Japan .................. 53-82607

[51] Int. Cl.³ ............................................ G06F 15/46
[52] U.S. Cl. ..................................... 364/474; 364/107
[58] Field of Search .............. 364/107, 117, 118, 474, 364/468, 475, 476; 318/574, 600

[56] References Cited

U.S. PATENT DOCUMENTS

| 3,598,978 | 8/1971  | Rempert      | 364/107 X |
| 3,628,002 | 12/1971 | Meese        | 364/117 X |
| 3,670,153 | 6/1972  | Rempert et al. | 364/107 X |
| 4,118,871 | 10/1978 | Kirkham      | 364/474 X |
| 4,131,837 | 12/1978 | Whetham      | 364/474 X |
| 4,181,958 | 1/1980  | Juengel et al. | 364/474 X |
| 4,190,889 | 2/1980  | Etoh et al.  | 364/474 |

FOREIGN PATENT DOCUMENTS

5157083 5/1976 Japan .

Primary Examiner—Felix D. Gruber
Attorney, Agent, or Firm—Oblon, Fisher, Spivak, McClelland & Maier

[57] ABSTRACT

A control system having a touch sensing circuit for emitting a contact detection signal when contact is made between a workpiece and a touch sensitive tool received in a tool spindle of a machine tool. An auxiliary controller is also provided for controlling movement of the tool spindle relative to the workpiece along orthogonal axes by applying feed pulses and axis designation signals to a numerical controller after switching the operational mode of the numerical controller. The auxiliary controller responds to the contact detection signal to align the tool spindle with the center of a workpiece bore when receiving a centering instruction and to measure the diameter of the workpiece bore when receiving a measuring instruction. The system is further provided with a motor control circuit which controls a motor to rotate the tool spindle during the centering operation. The motor control circuit inhibits the rotation of the tool spindle during the measuring operation.

7 Claims, 7 Drawing Figures

CONTROL SYSTEM FOR A MACHINE TOOL

BACKGROUND OF THE INVENTION

1. Field of the Invention

The present invention relates in general to a control system for a machine tool and more particularly, to a control system for a numerically controlled machine tool having control circuit arrangements which control the machine tool in response to a signal from a touch sensitive tool received in a machine tool spindle for centering the axis of the spindle on the center of a workpiece bore as well as for measuring the diameter of the workpiece bore.

2. Description of the Prior Art

Recently, there has been suggested a numerically controlled machine tool which is capable of automatically aligning the axis of a tool spindle with the center of a preliminary bore of a workpiece in advance of a finish boring. In a centering operation of the machine tool, a touch sensitive tool is inserted into the tool spindle in the same manner as the case of a boring tool, and the tool spindle is moved along two orthogonal controlled axes in the workpiece preliminary bore. A distance along each controlled axis (between two positions at each of which the touch sensitive tool received in the tool spindle contacts the internal surface of the preliminary bore) is calculated to detect the center of the preliminary bore, onto which the axis of the tool spindle is then positioned. Further, in the machine tool, it is possible to measure the diameter of the workpiece bore if modifications are made to move the tool spindle from the centering position, along one of the controlled axis, until the touch sensitive tool contacts the workpiece bore and then calculate the feed amount through which the tool spindle is moved during such transfer.

In order for the machine tool to perform precise spindle centering and precise diameter measuring, the touch sensitive tool must be received in the tool spindle with its axis exactly aligned with the rotational axis of the tool spindle. However, the exact alignment of the sensing tool axis with the spindle rotational axis cannot practically be realized because of either or both of: misalignment which the machine tool inherently has between the spindle rotational axis and the axis of the tool receiving bore; and foreign matters such as chips which, together with the touch sensitive tool, enter into the tool receiving bore. For these reasons, it is difficult to perform precise spindle centering and precise diameter measuring in the machine tool.

SUMMARY OF THE INVENTION

Accordingly, it is a primary object of the present invention to provide an improved control system for a machine tool capable not only of precisely aligning the rotational axis of a tool spindle with the axis of a workpiece bore, but also of precisely measuring the diameter of the workpiece bore.

Another object of the invention is to provide an improved control system for a machine tool having a spindle drive control circuit which controls a tool spindle drive motor so that a tool spindle receiving a touch sensitive tool is rotated in a centering operation, but stopped in a diameter measuring operation.

Briefly, these objects are achieved by the present invention through the provision of a control system for a machine tool having a tool spindle, a motor for rotating the tool spindle, and a plurality of servomotors for effecting movement of the tool spindle relative to a workpiece mounted on the machine tool along first and second orthogonal axes. The control system comprises: a feed controller connected to the servomotors for selectively controlling the same in accordance with feed pulses and axis designation signals; a touch sensitive tool received in the tool spindle; a touch sensing circuit electrically connected to the sensing tool for detecting the contact of the sensing tool with the workpiece; and an auxiliary controller connected to the touch sensing circuit and the feed controller for moving the tool spindle relative to the workpiece by applying feed pulses and axis designation signals to the feed controller while controlling the application of the feed pulses and the designation signals in response to a contact detection signal emitted from the touch sensing circuit.

The auxiliary controller, when receiving a centering instruction signal, serves to align the axis of the tool spindle with the center of a bore formed in the workpiece and, when receiving a measuring instruction signal, serves to measure the diameter of the workpiece bore by moving the tool spindle relative to the workpiece from one position to another position. At each of these positions, the touch sensitive tool contacts the workpiece along a path passing through the center of the workpiece bore. The control system further comprises a motor control circuit which controls the motor to rotate the tool spindle at a predetermined speed during the centering operation, but inhibits the rotation of the tool spindle during the measuring operation.

In the control system according to the invention, the centering operation is performed with the tool spindle rotating, whereas, the measuring operation is performed with the tool spindle stopped. Consequently, even if a misalignment exists between the axis of the tool spindle and the axis of the touch sensitive tool received therein, it is possible not only to precisely align the rotational axis of the tool spindle with the center of the workpiece bore, but also to precisely measure the diameter of the workpiece bore.

BRIEF DESCRIPTION OF THE DRAWING

Various other objects, features and attendant advantages of the present invention will readily be appreciated as the same becomes better understood by reference to the following detailed description of a preferred embodiment when considered in connection with the accompanying drawing, wherein like reference numerals designate like or corresponding parts throughout the several views, and in which.

DETAILED DESCRIPTION OF A PREFERRED EMBODIMENT

Figure 1:
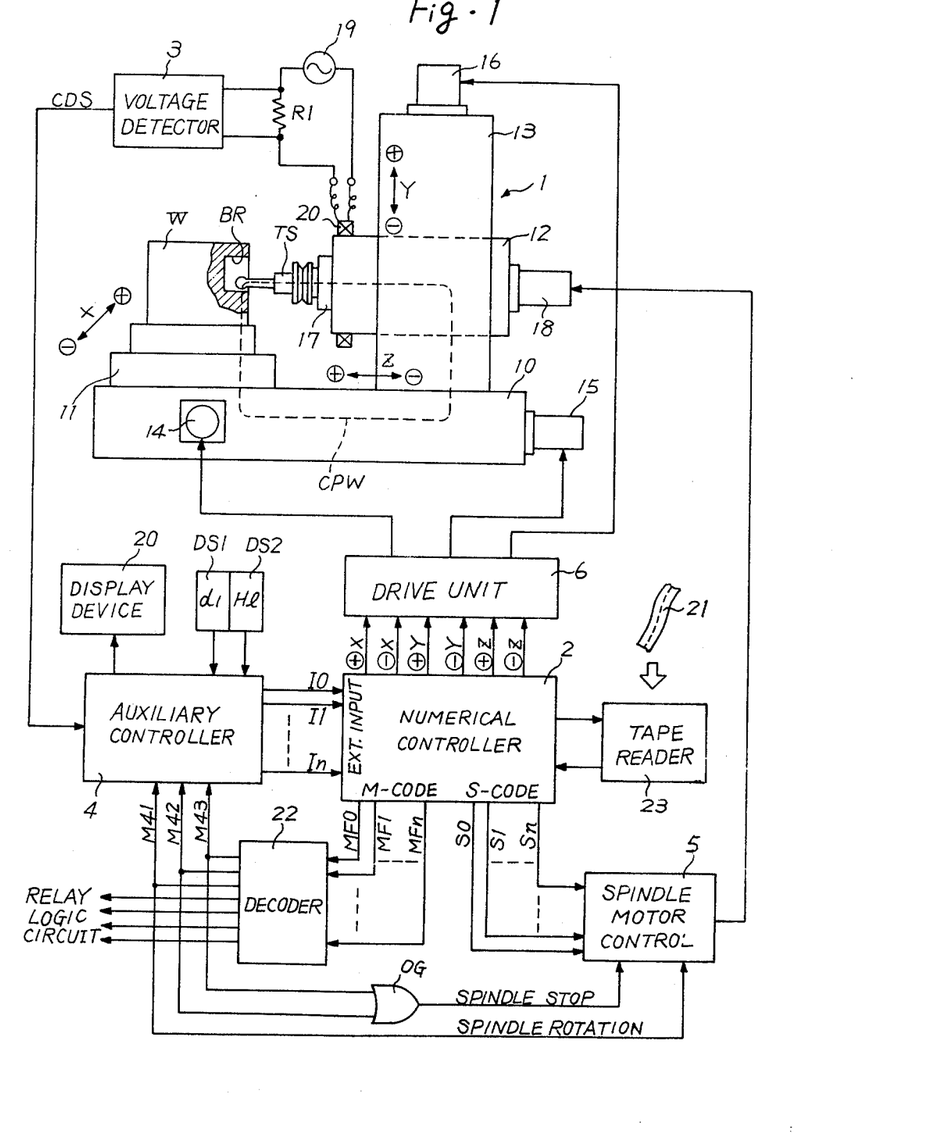
FIG. 1 is a block diagram of a control system according to the present invention, also illustrating the schematic construction of a numerically controlled machine tool used in the system.

Referring now to the drawing and more particularly to FIG. 1 thereof, there is illustrated a numerical control system having the function of automatically centering a tool spindle on the axis of a bore BR machined on a workpiece W and another function of automatically measuring the diameter of the bore BR. The system is composed chiefly of: a numerically controlled machine tool 1, a numerical controller 2, a touch sensing circuit including a voltage detector 3, an auxiliary controller 4 and a spindle motor control circuit 5.

The machine tool 1 comprises a bed 10, on which a table 11 for carrying the workpiece W is guided for sliding movement in an X-axis direction perpendicular to the drawing sheet. Also guided on the bed 10 for sliding movement in a transverse Z-axis direction is a column 13, on which a spindle head 12 is in turn guided for sliding movement in a vertical Y-axis direction. A servomotor 14 mounted on the bed 10 serves to move the table 11 in the X-axis direction, and other servomotors 15 and 16, mounted, respectively, on the rear end of the bed 10 and the top of the column 13, serve to move the spindle head 12, respectively, in the Z and Y-axis directions. These servomotors 14–16 are connected to the numerical controller 2 through a drive unit 6 and are responsive to feed pulses distributed from the numerical controller 2 so as to be rotationally driven, thereby controlling the relative position between tool spindle 17 and the workpiece W.

The tool spindle 17 is rotatably carried by the spindle head 12 and is in a driving connection with a spindle drive motor 18 mounted on the rear portion of the spindle head 12. The machine tool 1 further comprises a suitable automatic tool exchanger (not shown) which acts to insert a cutting tool (not shown) into the tool spindle 17 in advance of a machining operation of the workpiece W. Moreover, it acts to insert a touch sensitive tool TS into the tool spindle 17 in advance of any centering of the tool spindle 17 on the axis of the workpiece bore BR and any measuring of the diameter of the workpiece BR.

Connected to an AC power supply 19 and in series with a current detection resistance R1 is a touch sensitive coil 20, which is disposed around the front end circumferential surface of the tool spindle 17 so as to generate a magnetic flux encircling the tool spindle 17. Thus, when a probe of the touch sensitive tool TS contacts the workpiece W, at a spherical sensing surface formed on a front end thereof, induced current flows along an induced current passageway CPW, as indicated by the broken line shown in FIG. 1, and this decreases the impedance of the sensing coil 20. A decrease in the coil impedance causes the exciting current, passing through the coil 20, to increase, thereby raising the voltage that is applied to the resistance R1, so that the voltage signal input to the voltage detector 3 is elevated. The voltage detector 3 detects the contact of the touch sensing tool TS with a workpiece W by receiving the elevated voltage signal and emits a contact detection signal CDS upon such detection.

The numerical controller 2, acting as a feed controller, is of a conventional construction and controls the machine tool 1 during the machining of the workpiece W by effecting pulse distribution to the controlled X, Y and Z-axes in accordance with numerical control information, which is recorded on a punched tape 21 readable by a tape reader 23. Further, the numerical controller 2 is provided with a plurality of auxiliary function output terminals MFO-MFn and SO-Sn for outputting so-called "M-codes" and "S-codes", recorded on the punched tape 21, as well as with a plurality of external input terminals IO-In for receiving external operation input signals. These input terminals IO-In comprise: a terminal for receiving an automatic control halting instruction signal; a terminal for receiving a manual control instruction signal; terminals for receiving axis designation signals; terminals for receiving positive and negative direction feed pulses; a terminal for receiving an auxiliary function completion signal; and, a terminal for receiving an automatic control restarting instruction signal.

Data indicative of any S-code output from the numerical controller 2 is applied to the spindle motor control circuit 5 for controlling rotation of the spindle drive motor 18, so that the same can be rotated at a speed designated by the S-code. On the other hand, data indicative of any M-code is applied to a decoder 22, which, by decoding the M-code, emits one of various M-function signals in correspondence to the M-code. These M-function signals, except for several, are input to a relay logic control circuit for controlling various M-functions such as the ON-OFF operation of a coolant supply valve. M-function signals M41–M43 are assigned as those signals which instruct centering and measuring operations, respectively, and are input to the auxiliary controller 4. In this particular embodiment, the signal M41 is assigned as the instruction signal which instructs a centering operation, and the signals M42 and M43 are assigned as the instruction signals which, respectively, instruct bore diameter and depth measuring operations. The auxiliary controller 4, after receiving any of the M-function instruction signals M41–M43, is enabled to execute the auxiliary function that corresponds to the received instruction signal.

The spindle motor control circuit 5 is connected to the decoder 22 for receiving the instruction signal M41, which also acts as a spindle rotation instruction signal, and, through an OR gate OG, the instruction signals M42 and M43, each of which also acts as a spindle stop instruction signal. The control circuit 5 is arranged to inhibit the rotation of the spindle motor 18 upon receipt of any of the signals M42 and M43 and to rotate the spindle motor 18 at a predetermined rotational speed upon receipt of the signal M41. Thus, rotation of the tool spindle 17 is initiated when the numerical controller 2 emits the M-code M41 for instructing a centering operation and is inhibited when the controller 2 emits any of the M-codes M42 and M43 for instructing any of the bore diameter and depth measuring operations. In order to avoid any undesirable effect caused by a misalignment between the axes of the touch sensitive tool TS and the tool spindle 17, the predetermined rotational speed, at which the tool spindle 17 is rotated during the centering operation, is chosen to enable the tool spindle 17 to rotate through at least one rotation for a period of time that corresponds to the time that it takes the spindle head 12 or the workpiece W to travel through a distance corresponding to one feed pulse.

Figure 2:
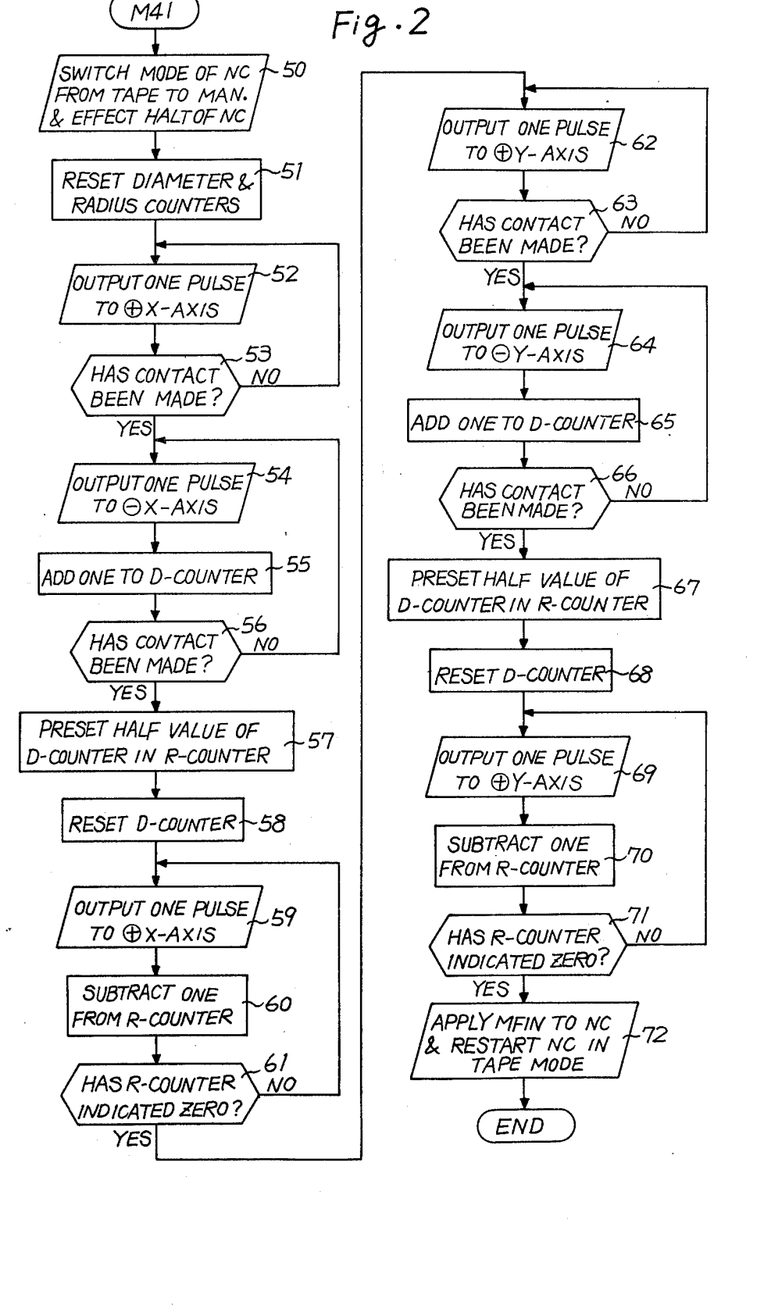
FIG. 2 is a flow chart indicative of the operation executed by an auxiliary controller of the control system when a centering instruction signal is given.
Figure 3:
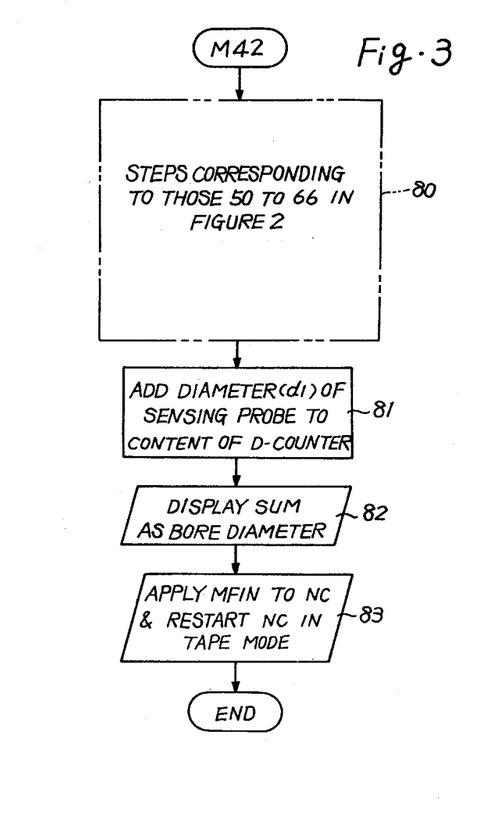
FIG. 3 is a flow chart indicative of the operation executed by the auxiliary controller when a diameter measuring instruction signal is given.
Figure 4:
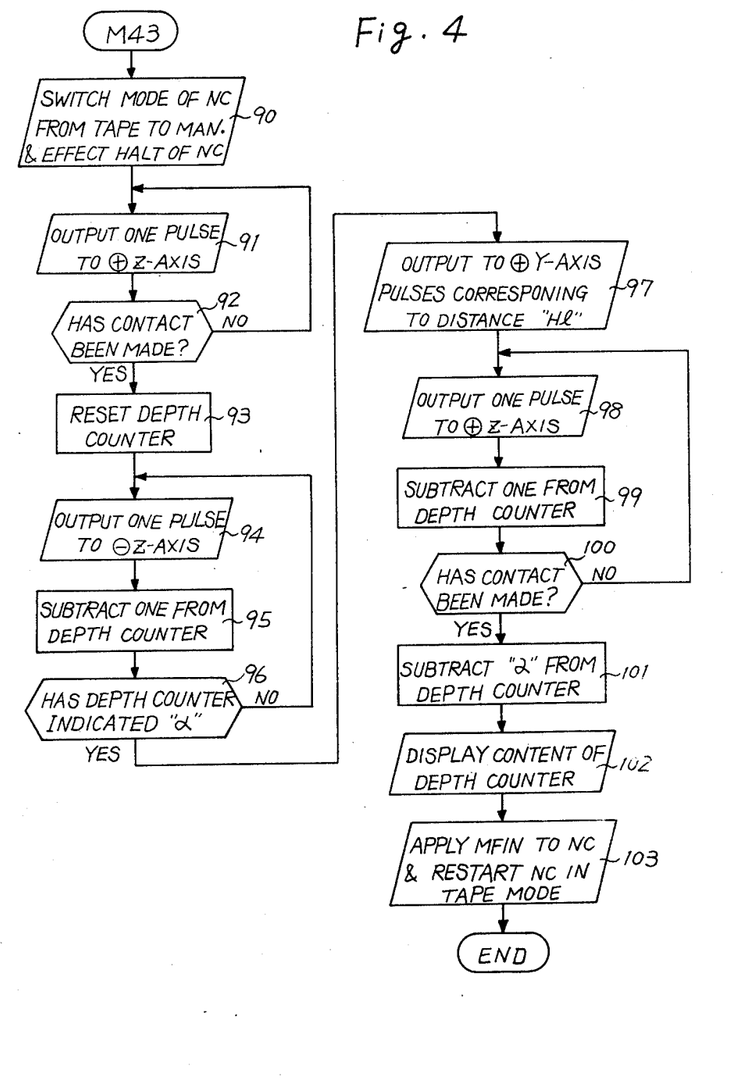
FIG. 4 is a flow chart indicative of the operation executed by the auxiliary controller when a depth measuring instruction signal is given.

The auxiliary controller 4 in this embodiment is constructed by a commercially available general purpose microcomputer which is programmed to control the centering operation and the bore diameter and depth measuring operations, in response to the M-function instruction signals M41-M43 as mentioned previously, by applying control signals and feed pulses to the external input terminals IO to In of the numerical controller 2. This controller 4, when receiving any of the instruction signals M41-M43, switches the operational mode of the numerical controller 2 from an automatic mode to a manual mode, designates one of the X, Y and Z-axes to the numerical controller 2 and applies feed pulses to the numerical controller 2. FIGS. 2 to 4, respectively, show flow charts according to which the auxiliary controller 4 operates when executing the centering operation and the bore diameter and depth measuring operations, respectively. The operation of the apparatus, as constructed above, will be described hereinafter with reference to these flow charts.

CENTERING OPERATION (FIG. 2)

Upon receiving the signal indicative of the M-function code M41, the auxiliary controller 4 switches the operational mode of the numerical controller 2 from the automatic mode to the manual mode in step 50. This is achieved by applying the automatic operation halting instruction signal and the manual operation instruction signal to designated terminals of input terminals IO-In. Further, in response to the M-function code M41, the motor control circuit 5 controls the spindle motor 18 to rotate the tool spindle 17 at the predetermined speed. In step 51, the auxiliary controller 4 resets a pair of diameter and radius detection counters (not shown) provided therein and in step 52, applies one feed pulse to the positive direction feed terminal of the input terminals IO-In and inputs the X-axis designation signal to the corresponding one of the terminals IO-In. The application of the X-axis designation signal is continued until another axis designation signal is applied to the corresponding one of the terminals IO-In. It is ascertained in step 53 whether the voltage detector 3 has emitted the detection signal CDS or not. In other words, whether the sensing tool TS has contacted the internal surface of the workpiece W or not. The steps 52 and 53 are repeatedly executed until YES is answered in step 53 (i.e., the table 11 is moved along the X-axis until the tool spindle 17 causes, at a position P1 shown in FIG. 5, the sensing tool TS to contact the internal surface of the workpiece W).

Upon receiving the contact detection signal CDS, the auxiliary controller 4 executes step 54 so as to apply one feed pulse to the negative direction feed terminal of the terminals IO-In and then, executes step 55 so as to add a one (1) to the contents of the diameter detection counter. Steps 54 and 55 and step 56, which is identical to step 53, are repeatedly executed in order to move the table 11 along the X-axis until the tool spindle 17 causes, at a position P2 shown in FIG. 5, the sensing tool TS to contact the internal surface of the workpiece W. Thus, a distance lx between the positions P1 and P2 is stored in the diameter detection counter.

Subsequently, half of the distance lx, stored in the diameter detection counter, is preset in the radius detection counter in step 57, and the diameter detection counter is reset in step 58 to have its contents reduced to zero (0). The same processing as executed in step 52 is executed in step 59, and a one (1) is substracted from the contents of the radius detection counter in step 60. The steps 59 and 60 are repeatedly executed until it is ascertained in step 61 that the contents of the radius detection counter have been reduced to zero (0). In this step, the workpiece W is moved along the X-axis so as to place the rotational axis OS of the tool spindle 17 on the median PM between the positions P1 and P2.

Figure 5:
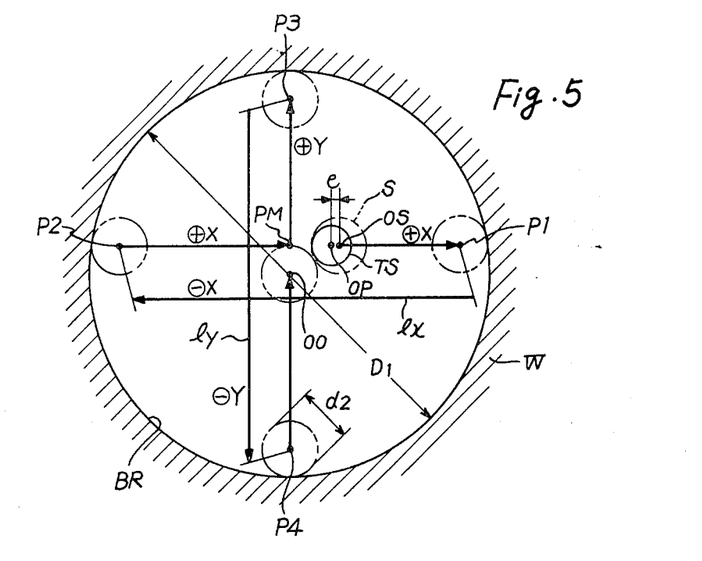
FIG. 5 is an explanatory view showing the motion locus that a touch sensitive tool draws in the centering operation.

Steps 62 and 71 correspond to the foregoing steps 52 to 61, respectively, and the only difference therebetween is that the steps 62 to 71 are executed to position the rotational axis OS of the tool spindle 17 at the median between positions P3 and P4 shown in FIG. 5. The rotational axis OS of tool spindle 17 is displaced to the center OO of the workpiece bore BR by moving the spindle head 12 along the Y-axis. To this end, the auxiliary controller 4 applies an axis designation signal only to the Y-axis designation terminal of the terminals IO-In in step 62. When YES is answered in step 63, the tool spindle 17 is displaced to the position P3, with the sensing tool TS contacting the internal surface of the workpiece W. The execution of steps 64 to 66 causes the tool spindle 17 to be moved to the position P4, thereby contacting the sensing tool TS with the workpiece internal surface. The execution of these steps further causes the diameter detection counter to store a distance ly that precisely coincides with the difference between the diameter D1 of the workpiece bore BR and a nominal diameter d2 of the sensing head of the sensing tool TS. A half value ly/2, of the distance ly, is preset in the radius detection counter in step 67, and therefore, when YES is answered in step 71, the rotational axis of the tool spindle 17 is brought into coaxial alignment with the center OO of the workpiece bore BR. It is important to note that the tool spindle 17, together with the touch sensitive tool TS, is rotated at the aforementioned predetermined rotational speed during this centering operation. Accordingly, even in the case where a misalignment (e) exists between the axis OP of the touch sensitive tool TS and the rotational axis OS of the tool spindle 17, such a misalignment is compensated for by the rotation of the tool spindle 17. Consequently, the spindle rotational axis OS can be precisely centered on the center OO of the workpiece bore BR.

In the final step 72, the auxiliary controller 4 stops applying: any axis designation signal; the automatic operation halting instruction signal; and, the manual operation instruction signal to the numerical controller 2. But the auxiliary controller 4 applies the M-function completion signal (MFIN) and the automatic operation restarting signal to the numerical controller 2. Thus, the centering operation is completed and the numerical controller 2 is enabled to restart the automatic operation which is executed in accordance with the tape information.

MEASUREMENT OF BORE DIAMETER (FIG. 3)

Figure 6:
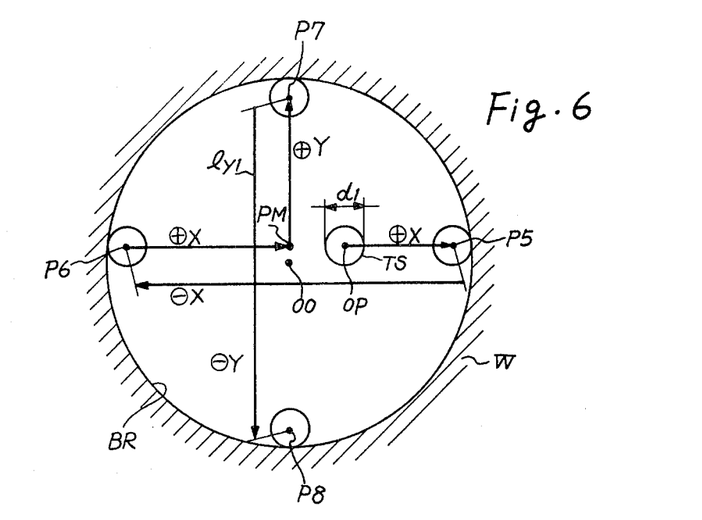
FIG. 6 is an explanatory view showing the motion locus that the sensing tool draws in the diameter measuring operation.

This operation is initiated when the diameter measuring instruction signal M42 is emitted from the decoder 22 after, as is the case with the centering operation, the sensing tool TS is positioned in the vicinity of the center OO of the workpiece bore BR in accordance with the tape information (i.e., in response to the instruction signal M42, the auxiliary controller 4 executes the routine shown in FIG. 3, and the motor control circuit 5 controls the spindle motor 18 to inhibit the rotation of the tool spindle 17). The auxiliary controller 4 executes in step 80 the same operations as those executed in steps 50 to 66 of the above-described centering operation. As a result, as illustrated in FIG. 6, the axis OP of the sensing tool TS is displaced from the vicinity of the workpiece bore center OO to a position P5 and is further displaced to a position P8 successively through a position P6, the median PM between the positions P5 and P6 and a position P7. With the arrival of the sensing tool axis OP at the position P8, a distance ly1, between the positions P7 and P8, is stored in the diameter detection counter.

In step 81, data preset in a digital switch DS1, which is connected to the auxiliary controller 4 for inputting thereto the actual diameter d1 of the spherical surface portion of the sensing tool TS, is added to the distance ly1 indicated by the diameter detection counter, and the sum of such addition is then outputted as the diameter of the workpiece bore BR to a display device 20 for display thereon. Accordingly, it is possible for an operator to know whether or not the bore BR or the workpiece W has been compared to the diameter that is designated on the punched tape 21 and, if the difference between the displayed diameter and the designated diameter is intolerable, then the operation of the numerical control system can be stopped immediately to remove any deficiencies which might have caused such intolerable difference. During this measuring operation, the rotation of the touch sensitive tool TS is inhibited since the diameter measuring instruction signal M42 is also applied as a spindle rotation stop signal to the spindle motor control circuit 5 through the OR gate OG. Therefore, any misalignment which may exist between the axis OP of the sensing tool TS and the rotational axis OS of the tool spindle 17 is prevented from causing errors in measurement, and the diameter of the workpiece bore BR can be precisely measured.

MEASUREMENT OF BORE DEPTH (FIG. 4)

Figure 7:
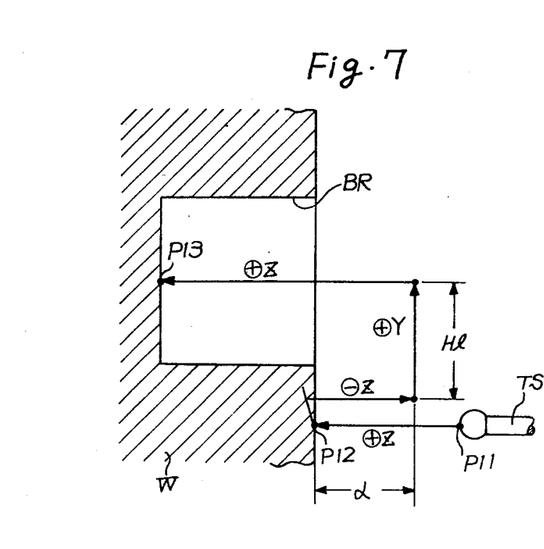
FIG. 7 is an explanatory view showing the motion locus that the sensing tool draws in the depth measuring operation.

This operation is initiated when the NC controller 2 outputs the instruction signal M43 after positioning the probe of the sensing tool TS out of the workpiece bore BR as shown in FIG. 7. As noted from FIG. 4, the touch sensitive tool TS is moved along the Z-axis in a positive-going direction (+), and a depth detection up-down counter (not shown), provided in the auxiliary controller 4, is reset when the probe of the sensing tool TS is brought into contact with a front surface of the workpiece W. The sensing tool TS is then retracted by a predetermined distance α (e.g., a 30-pulse distance), during which time a value corresponding to the predetermined distance α is subtracted from the contents of the up-down counter. The sensing tool TS is moved along the Y-axis by a distance H1 (the input from digital switch DS2 to the auxiliary controller 4) so as to be positioned in the vicinity of the axis of the workpiece bore BR. Further, the sensing tool TS is moved along the Z-axis in the positive-going direction (+) until it contacts a bottom wall of the workpiece bore BR, during which time the feed amount of the sensing tool TS is counted by the up-down counter. Consequently, data indicating the depth of the workpiece bore BR remains in the up-down counter and this depth data value is outputted to the display device 20 for display thereon.

In this particular embodiment, the rotation of the touch sensitive tool TS is inhibited during the depth measuring operation because the instruction signal M43 is applied as the rotation stop signal to the motor control circuit 5 through the OR gate OG. However, it is possible to perform the depth measuring operation, with the touch sensitive tool TS rotating because the rotation of the sensing tool TS hardly ever causes any errors in the measurement. It is noted that the foregoing depth measuring operation can be performed not only in measuring the depth of a bore, but also in measuring the depth of a channel or groove. Moreover, it can be used to measure the distance between two planes or flat surfaces that are separated from each other in the Z-axis direction.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A control system for a machine tool having a tool spindle rotatably carried therein, a motor drivingly connected to said tool spindle for rotating said tool spindle, and a plurality of servomotors for effecting movement of said tool spindle along first and second orthogonal axes relative to a workpiece mounted on said machine tool, said control system comprising:

feed control means connected to said servomotors for selectively controlling said servomotors in accordance with feed pulses and axis designation signals;

a touch sensitive tool capable of being received in said tool spindle;

touch sensing circuit means electrically connected to said touch sensitive tool for detecting contact of said touch sensitive tool with said workpiece and for emitting a contact detection signal upon such contact detection, said workpiece being formed with a bore;

auxiliary controller means connected to said touch sensing circuit means and said feed control means for performing the following functions:
   (i) a centering control in response to a centering instruction signal for applying feed pulses and axis designation signals to said feed control means while controlling the application of said feed pulses and said axis designation signals in response to said contact detection signal to thereby align the rotational axis of said tool spindle with the axis of said workpiece bore, and
   (ii) a diameter measuring control in response to a measuring instruction signal for applying feed pulses and axis designation signal to said feed control means so as to move said tool spindle relative to said workpiece from one position to another position at each of which said touch sensitive tool contacts said workpiece, along a path passing through the center of said workpiece bore, to thereby measure the diameter of said workpiece bore; and a motor control circuit connected to said motor for controlling said motor;

said motor and motor control circuit rotating said tool spindle at a predetermined speed said centering control function and inhibiting the rotation of said tool spindle when said auxiliary controller means is performing said diameter measuring control function.

2. A control system as set forth in claim 1, wherein:
said predetermined speed, at which said tool spindle is rotated when said auxiliary controller means is performing said centering control function, is chosen to enable said tool spindle to rotate through at least one rotation for the period of time that it takes to move said tool spindle through a distance corresponding to one feed pulse.

3. A control system as set forth in claim 2, wherein: said auxiliary controller means when performing said centering control function applies said feed pulses and said axis designation signals for moving said tool spindle relative to said workpiece along said first axis from a first position to a second position at each of which said touch sensitive tool contacts said workpiece, so as to then position said tool spindle at the median between said first and second positions and for subsequently moving said tool spindle relative to said workpiece along said second axis from a third position to a fourth position at each of which said touch sensitive tool contacts said workpiece and to thereafter position said tool spindle at the center of said workpiece bore which position coincides with the median between said third and fourth positions.

4. A control system as set forth in claim 1, 2 or 3, wherein said touch sensing circuit means comprises:
a resistor,
a coil connected to an electric power supply in series with said resistor and disposed around a front portion of said tool spindle for causing induced current to flow through said workpiece, said touch sensitive tool and said tool spindle when contact is made between said workpiece and said touch sensitive tool, and
a voltage detector connected to said resistor and said auxiliary controller means for detecting the change of voltage across said resistor to thereby apply said contact detection signal to said auxiliary controller means when contact is made between said workpiece and said touch sensitive tool.

5. A control system as set forth in claim 4, wherein: said feed control means comprises a numerical controller capable of controlling said servomotors in accordance with numerical control information recorded on a record medium when operated in a first operational mode and of controlling said servomotors in response to said feed pulses and said axis designation signals applied thereto from said auxiliary controller means during performing any of said centering control and said diameter measuring control functions when operated in a second operational mode.

6. A control system as set forth in claim 5, further comprising:
a decoder connected to said numerical controller and said auxiliary controller means for decoding first and second auxiliary function codes that said numerical controller outputs, in accordance with said numerical control information, respectively, into said centering instruction signal and said measuring instruction signal to thereby apply the same to said auxiliary controller means.

7. A control system as set forth in claim 6, wherein: said auxiliary controller means during performing of each of said centering control and said measuring control functions is adapted to switch the operational mode of said numerical controller from said first mode to said second mode before applying said feed pulses to said numerical controller and to restore said operational mode from said second mode to said first mode after completing such application of said feed pulses.

* * * * *